United States Patent [19]

Marx

[11] Patent Number: 5,090,475
[45] Date of Patent: Feb. 25, 1992

[54] LATENT HEAT STORAGE MEANS EMPLOYING BARIUM HYDROXIDE OCTAHYDRATE AS A STORAGE MEDIUM

[75] Inventor: Horst Marx, Geretsried, Fed. Rep. of Germany

[73] Assignee: Oskar Schatz, Gauting, Fed. Rep. of Germany

[21] Appl. No.: 584,064

[22] Filed: Sep. 18, 1990

[30] Foreign Application Priority Data

Sep. 19, 1989 [DE] Fed. Rep. of Germany ....... 3931205

[51] Int. Cl.$^5$ .............................................. F28D 20/00
[52] U.S. Cl. ....................................... 165/10; 165/905
[58] Field of Search .......................... 165/10, 133, 905

[56] References Cited

U.S. PATENT DOCUMENTS 3,773,031 11/1973 Laing ..................................... 165/10
4,161,809 7/1979 Severson .............................. 165/170

*Primary Examiner*—Albert W. Davis, Jr.
*Attorney, Agent, or Firm*—Harness, Dickey & Pierce

[57] ABSTRACT

In the case of a latent heat storage means having a storage medium consisting of or including barium hydroxide octahydrate at least the parts of the heat storage means exposed to the action barium hydroxide octahydrate consist of oxygen-free copper or an alloy thereof with one or more elements selected from the following group: nickel, chromium and phosphorus.

2 Claims, No Drawings

LATENT HEAT STORAGE MEANS EMPLOYING BARIUM HYDROXIDE OCTAHYDRATE AS A STORAGE MEDIUM

BACKGROUND OF THE INVENTION

The invention relates to a latent heat storage means with a barium hydroxide octahydrate storage composition, that is to say a composition made up of barium hydroxide octahydrate either alone or admixed with another material, contained in a storage core placed in at least one chamber which is adjacent to at least one flow path for a heat vehicle fluid.

For the sake of convenience the storage material will herein be simply referred to as a barium hydroxide octahydrate composition irrespectively of whether barium hydroxide octahydrate alone or a mixture on the basis of barium hydroxide octahydrate is utilized.

Barium hydroxide octahydrate ($Ba(OH)_2.8H_2O$) is more particularly suitable for the storage of latent heat from the engine cooling system in an automobile, because its phase transition temperature is favorable for this particular application and the costs are within reasonable limits. However, $Ba(OH)_2.8H_2O$ does exhibit aggressive properties which have so far been taken into account by the manufacture of the walls of the enclosure for the storage medium of stainless steel.

SHORT SUMMARY OF THE PRESENT INVENTION

One object of the invention is to reduce the costs occurring when a barium hydroxide octahydrate composition is used as a storage medium for latent heat storage devices, more especially by eliminating the costs of manufacture of the walling of the enclosure for the storage medium of stainless steel.

In order to achieve these or other objects appearing from the present specification and claims, the parts of the latent heat storage means exposed to the action of the medium are made of oxygen-free copper, as for instance in accordance with the German Industrial Standard DIN 1708, or an alloy of oxygen-free copper and at least one element selected from the group consisting essentially of nickel, chromium and phosphorus.

It has been shown that using the said material means that the enclosure of the said composition may be produced at a lower price than is the case with stainless steel and that in the present case of application, that is to say in the absence of air, the said material for the enclosure is resistant to $Ba(OH)_2.8H_2O$.

In accordance with a convenient development of the design of the latent heat storage means connections with its parts consisting of oxygen-free copper or alloys thereof with one or more elements in the said group are in the form of brazed joints using a brazing spelter material containing one or more of the elements copper, silver, chromium, phosphorus and nickel. Such spelter materials are more particularly suited for the connection of parts of the proposed material and form brazed joints which are resistant to the aggressive action of barium hydroxide octahydrate composition.

To take an example, containers made of material in accordance with the German Industrial Standard (DIN) 2.0090 and having joints using the spelter material Silfos 2 (DIN 8513, material 2.091), were filled with the said barium hydroxide composition and hermetically sealed.

During a period of use of three years in which the storage means was subject to several thousand fusing and solidification cycles no traces of corrosion could be detected.

I claim:

1. A latent heat storage means comprising a composition including barium hydroxide octahydrate as a storage medium contained in a storage core adjacent to at least one flow path for a heat vehicle fluid, characterized in that at least parts of the latent heat storage means exposed to action of the storage medium include of a material selected from a first group essentially consisting of: oxygen-free copper alone, an alloy of oxygen-free copper with at least one element selected from the second group essentially consisting of nickel, chromium, and phosphorus.

2. The latent heat storage means as claimed in claim 1, characterized in that connections on parts consisting of the first said group are in the form of brazed joints formed by a spelter material consisting of at least one element selected from the group essentially consisting of copper, silver, chromium, phosphorus and nickel.

* * * * *